(12) United States Patent
Wanko et al.

(10) Patent No.: US 11,649,840 B2
(45) Date of Patent: May 16, 2023

(54) HYDRAULIC LIFT AND WALKING SYSTEM FOR CATWALK MACHINE

(71) Applicant: SCHLUMBERGER TECHNOLOGY CORPORATION, Sugar Land, TX (US)

(72) Inventors: Jeffrey Wanko, Houston, TX (US); Glenn Thore Saebo, Kristiansand (NO); Max Paul Holand, Kristiansand (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 821 days.

(21) Appl. No.: 16/496,573

(22) PCT Filed: Mar. 23, 2018

(86) PCT No.: PCT/US2018/023926
§ 371 (c)(1),
(2) Date: Sep. 23, 2019

(87) PCT Pub. No.: WO2018/175832
PCT Pub. Date: Sep. 27, 2018

(65) Prior Publication Data
US 2020/0347864 A1    Nov. 5, 2020

Related U.S. Application Data

(60) Provisional application No. 62/475,595, filed on Mar. 23, 2017.

(51) Int. Cl.
*F16B 7/10*    (2006.01)
*B62D 57/02*   (2006.01)
(Continued)

(52) U.S. Cl.
CPC .............. *F16B 7/105* (2013.01); *B62D 57/02* (2013.01); *E21B 19/155* (2013.01); *F16H 21/02* (2013.01); *F16M 7/00* (2013.01); *F16M 2200/02* (2013.01)

(58) Field of Classification Search
USPC ............ 248/351, 354.1, 354.3, 354.5, 354.6, 248/354.7, 219.1, 220.21, 220.22, 222.11,
(Continued)

(56) References Cited

U.S. PATENT DOCUMENTS 2,662,712 A * 12/1953 Rose ..................... H01Q 1/1235
403/324
3,069,212 A * 12/1962 Wiseman ............... A47B 91/02
248/188.5
(Continued)

FOREIGN PATENT DOCUMENTS

KR     200200147 Y1    10/2000
KR     200234840 Y1    10/2001
(Continued)

*Primary Examiner* — Alfred J Wujciak
(74) *Attorney, Agent, or Firm* — Jeffrey D. Frantz

(57) ABSTRACT

A locking device includes an outer portion and an inner portion. The outer portion has a bore formed at least partially axially therethrough and a channel formed laterally therethrough. The inner portion is positioned at least partially within the bore. A first link is positioned at least partially outside of the outer portion and coupled to the inner portion through the channel. A second link is coupled to the outer portion. A pin is coupled to the first link and the second link. The locking device is in an unlocked state when the inner portion is fully positioned within the bore, and the locking device is in a locked state when an end of the inner portion extends axially out of the bore.

6 Claims, 6 Drawing Sheets

(51) Int. Cl.
*E21B 19/15* (2006.01)
*F16H 21/02* (2006.01)
*F16M 7/00* (2006.01)

(58) Field of Classification Search
USPC ...... 248/222.51, 222.52, 407, 408, 410, 411, 248/413, 423
See application file for complete search history.

(56) References Cited

U.S. PATENT DOCUMENTS

| | | | |
|---|---|---|---|
| 4,035,096 A * | 7/1977 | Miller | B66F 9/07545 |
| | | | 248/408 |
| 4,434,970 A * | 3/1984 | Boland | F16B 7/105 |
| | | | 410/151 |
| 7,819,209 B1 | 10/2010 | Bezner | |
| 9,518,429 B2 | 12/2016 | Fortson et al. | |
| 9,739,098 B2 | 8/2017 | Fox | |
| 9,751,578 B2 | 9/2017 | Smith et al. | |
| 9,951,539 B2 | 4/2018 | Roodenburg et al. | |
| 9,988,112 B2 | 6/2018 | Smith et al. | |
| 10,232,876 B2 | 3/2019 | Alden et al. | |
| 10,273,754 B2 | 4/2019 | Niemczyk | |
| 2004/0178306 A1 | 9/2004 | Hallberg | |
| 2010/0012811 A1 | 1/2010 | MacKenzie et al. | |
| 2010/0258701 A1* | 10/2010 | Foreman | B62K 19/36 |
| | | | 248/408 |
| 2017/0321490 A1 | 11/2017 | Haavind | |

FOREIGN PATENT DOCUMENTS

| | | |
|---|---|---|
| KR | 1020030006803 A | 1/2003 |
| WO | 2017192359 A1 | 11/2017 |

* cited by examiner

HYDRAULIC LIFT AND WALKING SYSTEM FOR CATWALK MACHINE

CROSS-REFERENCE TO RELATED APPLICATIONS

This application claims priority to U.S. Provisional Patent Application No. 62/475,595, filed on Mar. 23, 2017, which is hereby incorporated by reference in its entirety.

BACKGROUND

A catwalk machine may be used to deliver a joint of tubing (e.g., drill pipe or casing) to a drill floor. Once delivered to the drill floor, a top drive may grab the joint and lift the joint up into a mast, where the joint may be assembled with other joints to form a string (e.g., a drill string or a casing string). The string may then be lowered through a wellhead and into a wellbore.

The catwalk machine includes a plurality of legs that are configured to move to enable the catwalk machine to "walk" along the ground to reposition the catwalk machine. In some instances, an existing wellhead may be in the path of the catwalk machine. The legs may include one or more hydraulic cylinders that are configured to lift the catwalk machine up high enough to provide a clearance between the wellhead and the catwalk machine as the catwalk machine walks over the wellhead. Although the hydraulic cylinders are able to lift the catwalk machine, the hydraulic cylinders may not be able to support the weight of the catwalk machine indefinitely.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A locking device is disclosed. The locking device includes an outer portion and an inner portion. The outer portion has a bore formed at least partially axially therethrough and a channel formed laterally therethrough. The inner portion is positioned at least partially within the bore. A first link is positioned at least partially outside of the outer portion and coupled to the inner portion through the channel. A second link is coupled to the outer portion. A pin is coupled to the first link and the second link. The locking device is in an unlocked state when the inner portion is fully positioned within the bore, and the locking device is in a locked state when an end of the inner portion extends axially out of the bore.

A system is also disclosed. The system includes a leg and a locking device. The leg includes a lower portion and an upper portion. The upper portion moves with respect to the lower portion as the leg actuates between a contracted state and an extended state. The locking device is coupled to the upper portion of the leg. The locking device actuates between an unlocked state and a locked state. The locking device is not in contact with the lower portion of the leg when the locking device is in the unlocked state, and the locking device is in contact with the lower portion of the leg and secures the leg in the extended state when the locking device is in the locked state.

A method for moving a catwalk machine is also disclosed. The method includes engaging a locking device with an actuator. The locking device is coupled to an upper portion of a leg. The locking device includes an outer portion having a bore formed at least partially axially therethrough and a channel formed laterally therethrough. An inner portion is positioned at least partially within the bore. A first link is positioned at least partially outside of the outer portion and coupled to the inner portion through the channel. A second link is coupled to the outer portion. A pin is coupled to the first link and the second link. The method also includes actuating the locking device into a locked state using the actuator to cause an end of the inner portion to extend axially out of the bore and contact a lower portion of the leg.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
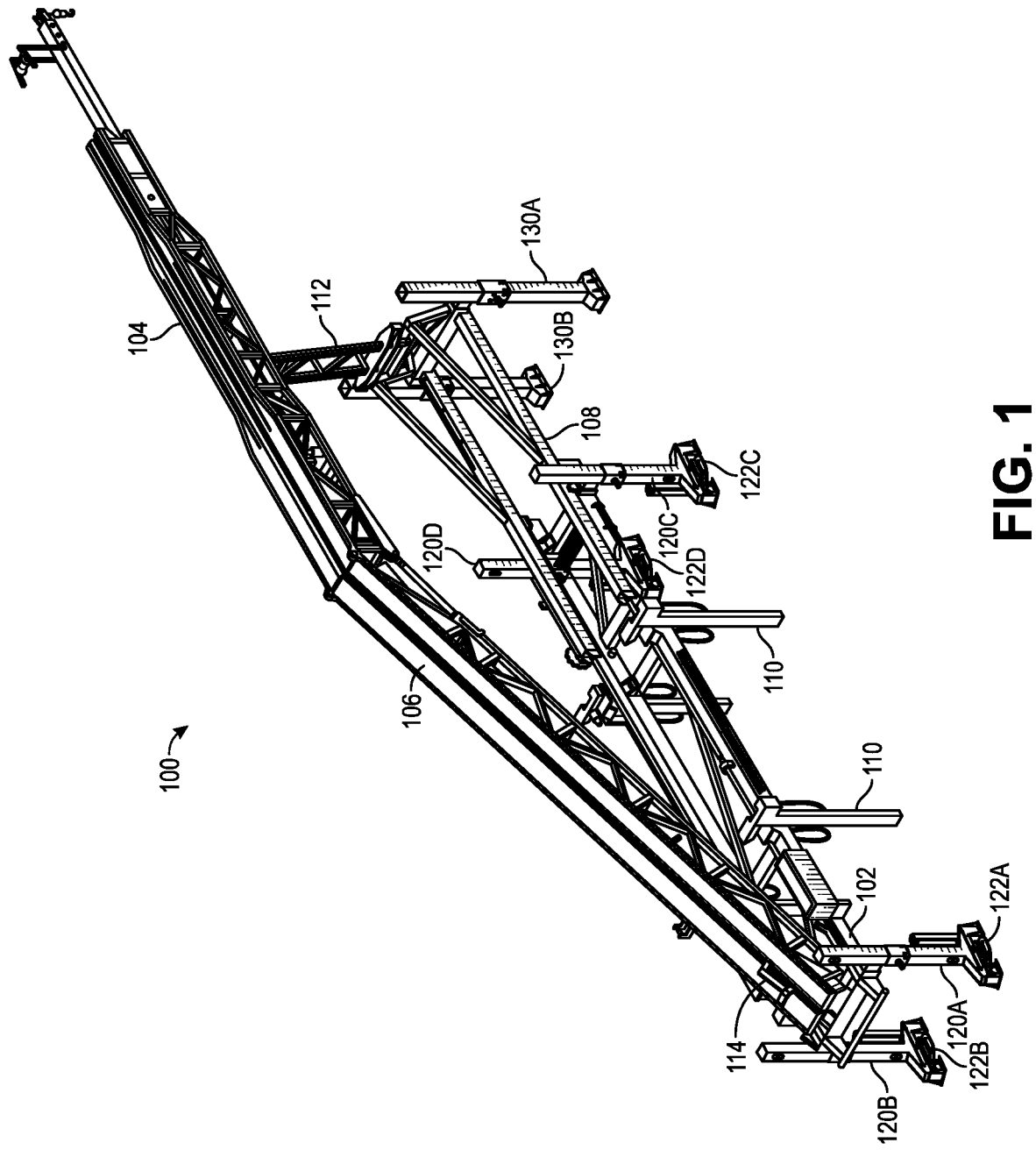
FIG. 1 shows a perspective view of a catwalk machine, according to an embodiment.

FIG. 1 shows a perspective view of a catwalk machine 100, according to an embodiment. The catwalk machine 100 may include a substructure 102, an upper ramp 104, a lower ramp 106, a telescopic frame 108, a tubular feeding unit (TFU) 110, a pinned leg 112, a tubular pusher 114, one or more walking legs (four are shown: 120A-D), one or more walking feet (four are shown: 122A-D), and one or more front elevating legs (two are shown: 130A, 130B).

Figure 2:
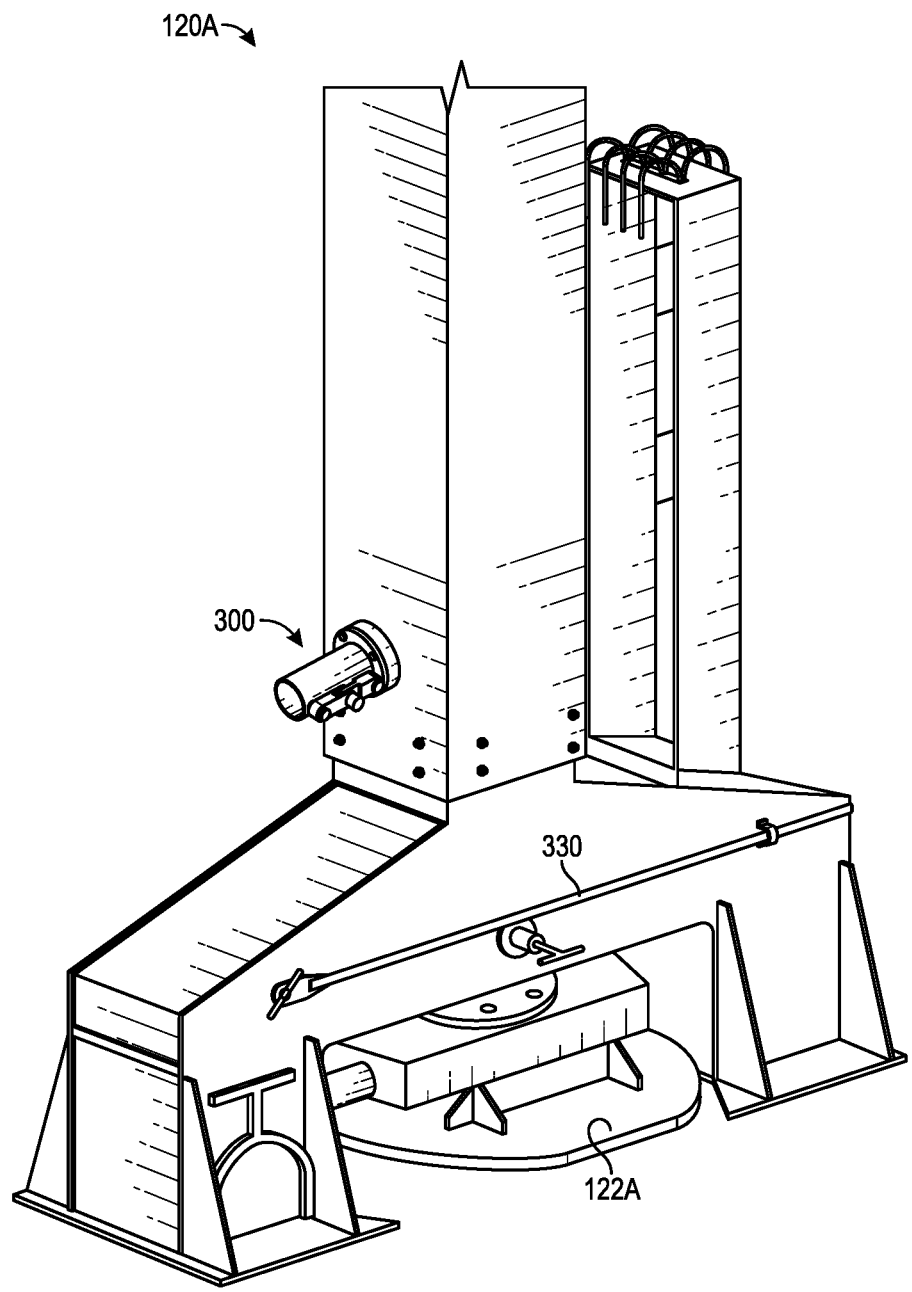
FIG. 2 shows a perspective view of a leg of the catwalk machine in a first, contracted state, according to an embodiment.

FIG. 2 shows a perspective view of a leg 120A of the catwalk machine 100 in a first, contracted state, according to an embodiment. While FIG. 2 shows the walking leg 120A, the other walking legs 120B-D may have a similar structure and may function in the same manner as the walking leg 120A. In at least one embodiment, the elevating legs 130A, 130B may have a similar structure and may function in the same manner as the walking leg 120A, except, the elevating legs 130A, 130B may not have the walking foot 122A coupled thereto. Thus, the elevating legs 130A, 130B may be able to extend and contract (e.g., vertically) similar to the walking legs 120A-D, but may not walk (e.g., horizontally) like the walking legs 120A-D.

Figure 3:
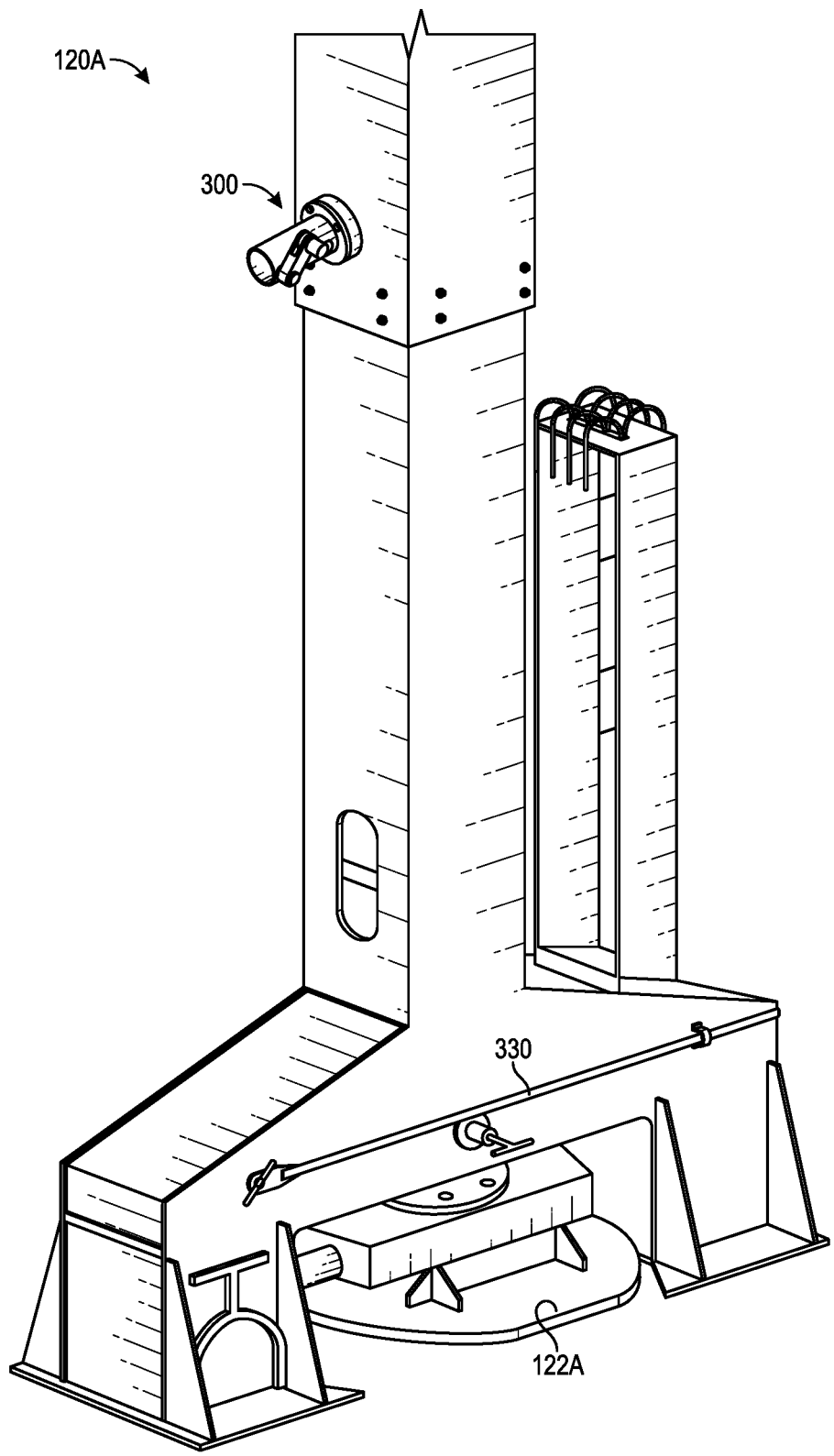
FIG. 3 shows a perspective view of the leg of the catwalk machine in a second, extended state, according to an embodiment.

FIG. 3 shows a perspective view of the walking leg 120A of the catwalk machine 100 in a second, extended state, according to an embodiment. The walking leg 120A may include a first, lower portion 124A and a second, upper portion 126A. The lower portion 124A may be positioned at least partially within the upper portion 126A. One or more hydraulic cylinders (not shown) positioned within the walking leg 120A may be configured to raise the upper portion 126A with respect to the lower portion 124A. This may extend (i.e., increase the length of) the walking leg 120A from the first, contracted state (FIG. 2) into the second, extended state (FIG. 3). The hydraulic cylinder(s) may also be configured to lower the upper portion 126A with respect to the lower portion 124A. This may contract (i.e., reduce the length of) the walking leg 120A from the second, extended state (FIG. 3) into the first, contracted state (FIG. 2).

Each of the walking legs 120A-D may be configured to extend simultaneously, thereby lifting/raising the substructure 102 farther off of the ground, as shown in FIG. 3. Similarly, each of the walking legs 120A-D may be configured to contract simultaneously, thereby lowering the substructure 102 closer to the ground, as shown in FIG. 2.

A locking device 300 may be coupled to or integral with the upper portion 126A of the walking leg 120A. Although not shown, in another embodiment, the locking device 300 may instead be coupled to or integral with the lower portion 124A of the walking leg 120A. The locking device 300 may be or include a mechanical locking pin. The locking device 300 is described in greater detail below with respect to FIGS. 4-7.

An actuator 330 may also be coupled to the lower portion 124A of the walking leg 120A. The actuator 330 may be or include a rod that is configured to be decoupled from the walking leg 120A and then used/wielded by a user. More particularly, the locking device 300 may be out of the user's reach when the walking leg 120A is in the extended state (e.g., greater than 3 meters off of the ground), and the user may use the actuator 330 to extend/reach upward and engage the locking device 300.

Figure 4:
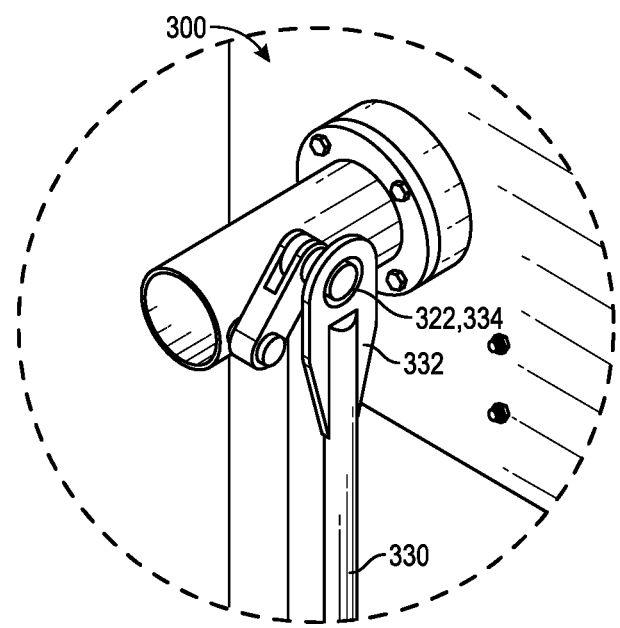
FIG. 4 shows a perspective view of a locking device in a first, unlocked state and being engaged by an actuator, according to an embodiment.
Figure 5:
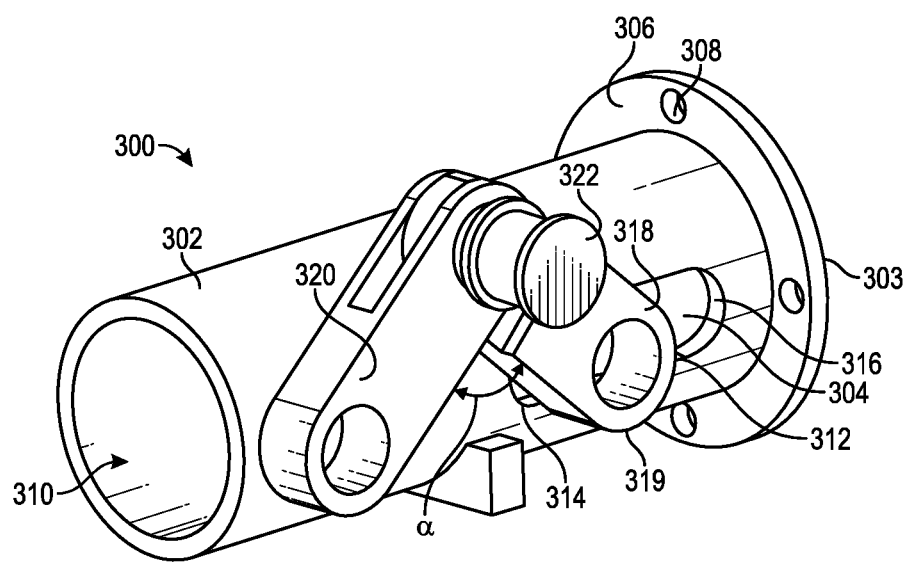
FIG. 5 shows a perspective view of the locking device in the first, unlocked state, according to an embodiment.

FIG. 4 shows a perspective view of the locking device 300 in a first, unlocked state and being engaged by the actuator 330, and FIG. 5 shows a perspective view of the locking device 300 in the first, unlocked state (with the walking leg 120A and actuator 330 omitted for clarity), according to an embodiment. The locking device 300 may include a first, outer portion 302 and a second, inner portion 304. The outer portion 302 of the locking device 300 may be configured to be coupled to the upper portion 126A of the walking leg 120A. More particularly, the outer portion 302 of the locking device 300 may include a flange 306 having one or more openings 308 formed therethrough for receiving coupling devices (e.g., bolts, screws, etc.) for coupling the outer portion 302 of the locking device 300 to the upper portion 126A of the walking leg 120A.

The outer portion 302 may have a bore 310 formed at least partially axially therethrough, and the inner portion 304 may be positioned at least partially within the bore 310. The outer portion 302 may also define an axial channel 312 that provides access laterally (e.g., radially) through the outer portion 302 to the inner portion 304. A first link 318 may be positioned at least partially outside of the outer portion 302 and coupled to the inner portion 304 through the channel 312. A second link 320 may be positioned at least partially outside of the outer portion 302 and coupled to the outer portion 302. The first and second links 318, 320 may also be coupled together via a pin 322. The pin 322 may extend laterally-outward from the first and second links 318, 320. As shown in FIG. 4, an upper end 332 of the actuator 330 may have an opening 334 that is sized and shaped to engage the pin 322 (e.g., to have the pin 322 fit within the opening 334).

When the locking device 300 is in the unlocked position, the inner portion 304 may be positioned (e.g., entirely) within the outer portion 302. In other words, an end 305 (not shown in FIGS. 4 and 5; see FIG. 7) of the inner portion 304 may not extend beyond an end 303 of the outer portion 302. As a result, the inner portion 304 may not be positioned at least partially within or otherwise contact or engage the lower portion 124A of the walking leg 120A.

In addition, when the locking device 300 is in the unlocked position, an end 319 of the first link 318 may be positioned proximate to an inner end 314 of the channel 312. As a result, an angle α between the first and second links 318, 320 may be from about 45° to about 170°, about 60° to about 135°, or about 75° to about 105°.

Figure 6:
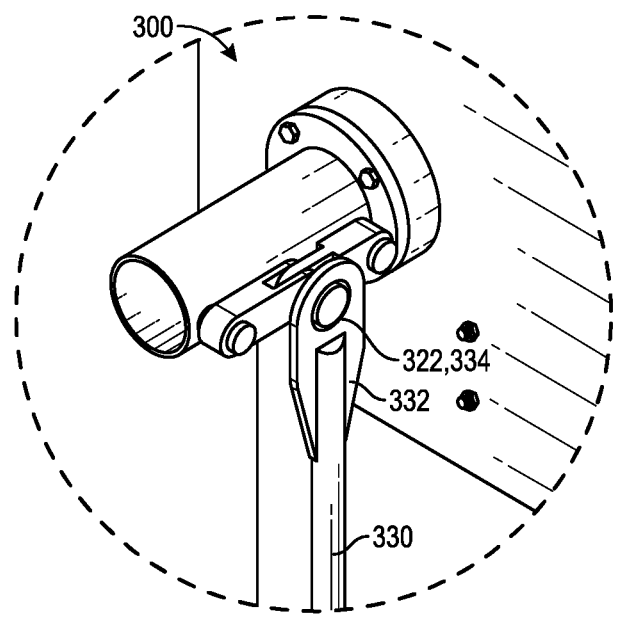
FIG. 6 shows a perspective view of the locking device in a second, locked state and being engaged by the actuator, according to an embodiment.
Figure 7:
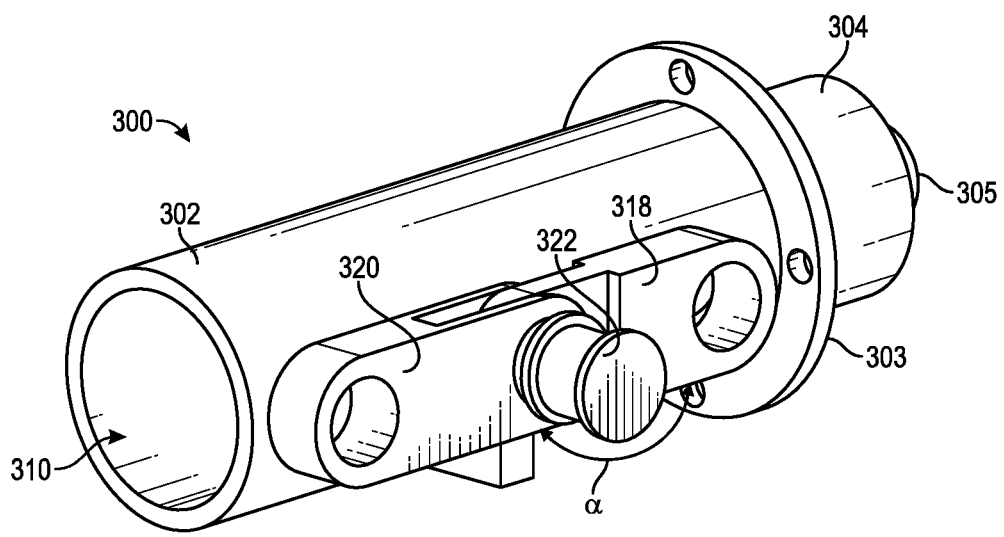
FIG. 7 shows a perspective view of the locking device in the second, locked state, according to an embodiment.

FIG. 6 shows a perspective view of the locking device 300 in a second, locked state and being engaged by the actuator 330, and FIG. 7 shows a perspective view of the locking device in the second, locked state (with the walking leg 120A and actuator 330 omitted for clarity), according to an embodiment. When the actuator 330 is engaged with the pin 322, the user may actuate the locking device 300 into the locked state. More particularly, the user may exert a downward force on the actuator 330, which may pull the pin 322 downward. As the pin 322 moves downward, the end 319 of the first link 318 may move or slide toward an outer end 316 (see FIG. 5) of the channel 312. This may cause the angle α to increase to from about 150° to about 180°, about 160° to about 180° or about 170° to about 180°.

The end 319 of the first link 318 may be coupled to the inner portion 304, as described above. Thus, as the end 319 of the first link 318 moves toward the outer end 316 of the channel 312, this may cause the inner portion 304 to move or slide with respect to the outer portion 302. More particularly, the end 305 of the inner portion 304 may slide beyond the end 303 of the outer portion 302. As a result, the inner portion 304 may be positioned at least partially within or otherwise contact or engage the lower portion 124A of the walking leg 120A to lock/secure the lower and upper portions 124A, 126A of the walking leg 120A in the (e.g., extended) state.

Although the locking device 300 is described as actuating into the locked position when the pin 322 is moved downward and actuating into the unlocked position when the pin 322 is moved upward, in a different embodiment, the locking device 300 may instead actuate into the locked position when the pin 322 is moved upward and actuate into the unlocked position when the pin 322 is moved downward.

Figure 8:
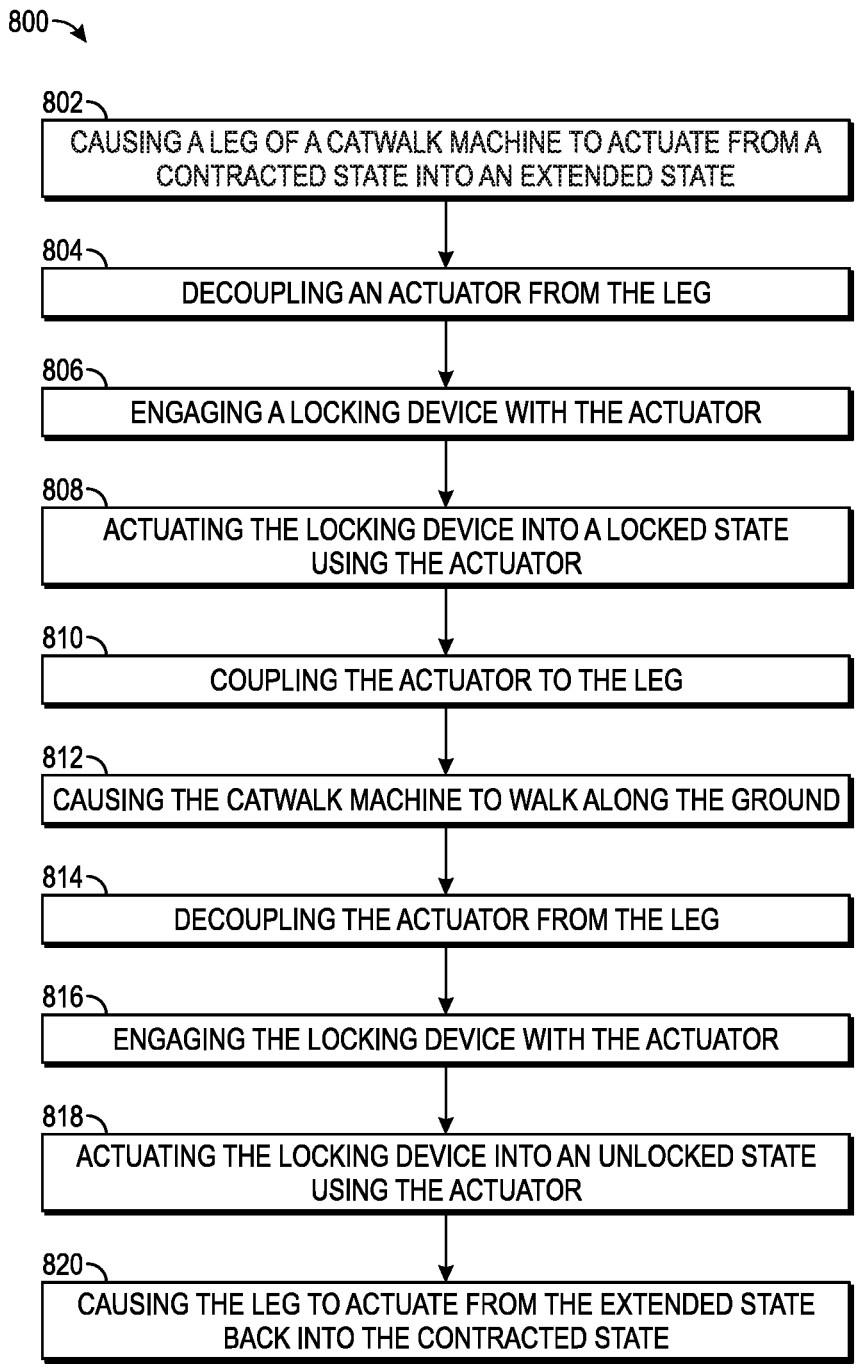
FIG. 8 shows a flowchart of a method for moving a catwalk machine, according to an embodiment.

FIG. 8 shows a flowchart of a method 800 for moving the catwalk machine 100, according to an embodiment. The method 800 may include causing the walking leg 120A to actuate from the first, contracted state into the second, extended state, as at 802. For example, this may include a user manually actuating a button or lever on an operator panel, control chair, etc., which may cause one or more hydraulic cylinders in the walking leg 120A to lift the upper portion 126A of the walking leg 120A upward with respect to the lower portion 124A of the walking leg 120A.

The method 800 may also include decoupling the actuator 330 from the (e.g., walking leg 120A of the) catwalk machine 100, as at 804. The method 800 may also include engaging the locking device 300 with the actuator 330, as at 806. This may include (e.g., manually) raising the upper end 332 of the actuator 330 and positioning it such that the pin 322 of the locking device 300 is inserted at least partially into the opening 334 in the actuator 330.

The method 800 may also include actuating the locking device 300 into the locked state using the actuator 330, as at 808. This may include pulling the actuator 330 downward, thereby pulling the pin 322 downward. As described above, as the pin 322 moves downward, the first link 314 may move the inner portion 304 of the locking device 300 horizontally at least partially into a corresponding hole or opening in the lower portion 124A of the walking leg 120A. This may lock/secure the lower and upper portions 124A, 126A of the walking leg 120A in the (e.g., extended) state, which places the load of the (e.g., substructure 102 of the) catwalk machine 100 on the locking device 300, thereby taking the load off of the hydraulic cylinder(s).

The method 800 may also include coupling the actuator 330 to the (e.g., walking leg 120A of the) catwalk machine 100, as at 810. The method 800 may also include causing the catwalk machine 100 to walk along the ground to another position, as at 812. This may include walking over an existing wellhead while the walking leg 120A is in the extended state. The walking leg 120A being in the extended state may provide a clearance between the substructure 102 and the existing wellhead as the catwalk machine 100 walks.

When in the desired position (e.g., after walking), the method 800 may again include decoupling the actuator 330 from the (e.g., walking leg 120A of the) catwalk machine 100, as at 814. The method 800 may again include engaging the locking device 300 with the actuator 330, as at 816.

The method 800 may also include actuating the locking device 300 into the unlocked state using the actuator 330, as at 818. This may include pushing the actuator 330 upward, which pushes the pin 322 upward. As described above, as the pin 322 moves upward, the first link 314 may move the inner portion 304 of the locking device 300 horizontally out of the hole or opening in the lower portion 124A of the walking leg 120A, and back (e.g., fully) into the outer portion 302 of the locking device 300. This may unlock the lower and upper portions 124A, 126A of the walking leg 120A, which places the load of the catwalk machine 100 back onto the hydraulic cylinder(s).

The method 800 may also include causing the walking leg 120A to actuate from the second, extended state back into the first, contracted state, as at 820. For example, this may include the user manually actuating the button or lever on the operator panel, control chair, etc., which may cause one or more hydraulic cylinders in the walking leg 120A to lower the upper portion 126A of the walking leg 120A downward with respect to the lower portion 124A of the walking leg 120A.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for moving a catwalk machine, comprising:
engaging a locking device with an actuator, wherein the locking device is coupled to an upper portion of a leg, and wherein the locking device comprises:
an outer portion having:
a bore formed at least partially axially therethrough; and
a channel formed laterally therethrough;
an inner portion positioned at least partially within the bore;
a first link positioned at least partially outside of the outer portion and coupled to the inner portion through the channel;
a second link coupled to the outer portion; and
a pin coupled to the first link and the second link, wherein the actuator is connected to the pin; and
actuating the locking device into a locked state using the actuator to cause an end of the inner portion to extend axially out of the bore and contact a lower portion of the leg,
wherein the lower portion of the leg is positioned at least partially within the upper portion of the leg.

2. The method of claim 1, wherein actuating the locking device into the locked state comprises pulling the pin downward using the actuator.

3. The method of claim 1, further comprising actuating the locking device into an unlocked state using the actuator to cause the end of the inner portion to retract out of contact with the lower portion of the leg and into the bore.

4. The method of claim 3, wherein actuating the locking device into the unlocked state comprises pushing the pin upward using the actuator.

5. The method of claim 1, further comprising causing the leg to actuate from a first, contracted state to a second, extended state prior to actuating the locking device into the locked state, which secures the leg in the extended state.

6. The method of claim 5, further comprising causing the catwalk machine to walk along the ground when the leg is secured in the extended state.

* * * * *